United States Patent [19]
Conner

[11] Patent Number: 5,823,662
[45] Date of Patent: Oct. 20, 1998

[54] HIGH EFFICIENCY ILLUMINATION SYSTEM

[75] Inventor: Arlie R. Conner, Tualatin, Oreg.

[73] Assignee: Lightware, Inc., Beaverton, Oreg.

[21] Appl. No.: 295,596

[22] Filed: Aug. 25, 1994

[51] Int. Cl.⁶ ........................................... F21V 5/00
[52] U.S. Cl. ........................................ 362/328; 362/346
[58] Field of Search .......................... 362/328, 297, 362/343, 346

[56] References Cited

U.S. PATENT DOCUMENTS

| | | | |
|---|---|---|---|
| 3,132,812 | 5/1964 | Strobel | 362/297 |
| 3,588,493 | 6/1971 | Norquist | 362/297 |
| 4,344,111 | 8/1982 | Ruud et al. | 362/346 |
| 4,516,832 | 5/1985 | Jain et al. | 350/96.24 |
| 4,619,508 | 10/1986 | Shibuya et al. | 353/122 |
| 4,642,740 | 2/1987 | True | 362/268 |
| 4,650,286 | 3/1987 | Koda et al. | 350/331 R |
| 4,722,593 | 2/1988 | Shimazaki | 350/336 |
| 4,796,978 | 1/1989 | Tanaka et al. | 350/337 |
| 4,798,448 | 1/1989 | van Raalte | 350/345 |
| 4,824,210 | 4/1989 | Shimazaki | 350/331 R |
| 4,913,529 | 4/1990 | Goldenberg et al. | 350/337 |
| 4,918,583 | 4/1990 | Kudo et al. | 362/268 |
| 4,953,063 | 8/1990 | Nino | 362/346 |
| 5,046,837 | 9/1991 | Stroomer et al. | 353/82 |
| 5,092,672 | 3/1992 | Vanderwerf | 353/102 |
| 5,098,184 | 3/1992 | van den Brandt et al. | 353/102 |
| 5,105,265 | 4/1992 | Sato et al. | 358/60 |
| 5,153,621 | 10/1992 | Vogeley | 353/30 |
| 5,207,496 | 5/1993 | Stanuch et al. | 362/297 |
| 5,300,971 | 4/1994 | Kudo | 355/67 |
| 5,355,187 | 10/1994 | Ogino et al. | 353/38 |

*Primary Examiner*—James C. Yeung
*Assistant Examiner*—Alfred Basichas
*Attorney, Agent, or Firm*—Hancock Meininger & Porter LLP

[57] ABSTRACT

A conventional illumination system is supplemented by auxiliary reflectors to "fill-in" corner areas of a rectangular frame, providing more uniform illumination. The auxiliary reflectors intercept light that is emitted from the source in directions away from the system's condenser lens and any primary reflector, resulting in increased efficiency.

17 Claims, 4 Drawing Sheets

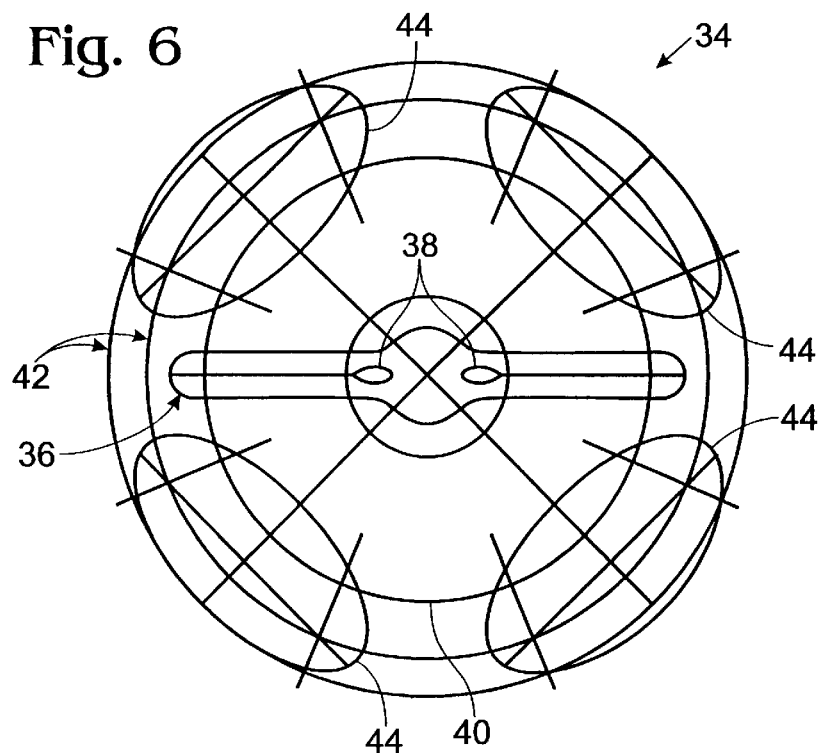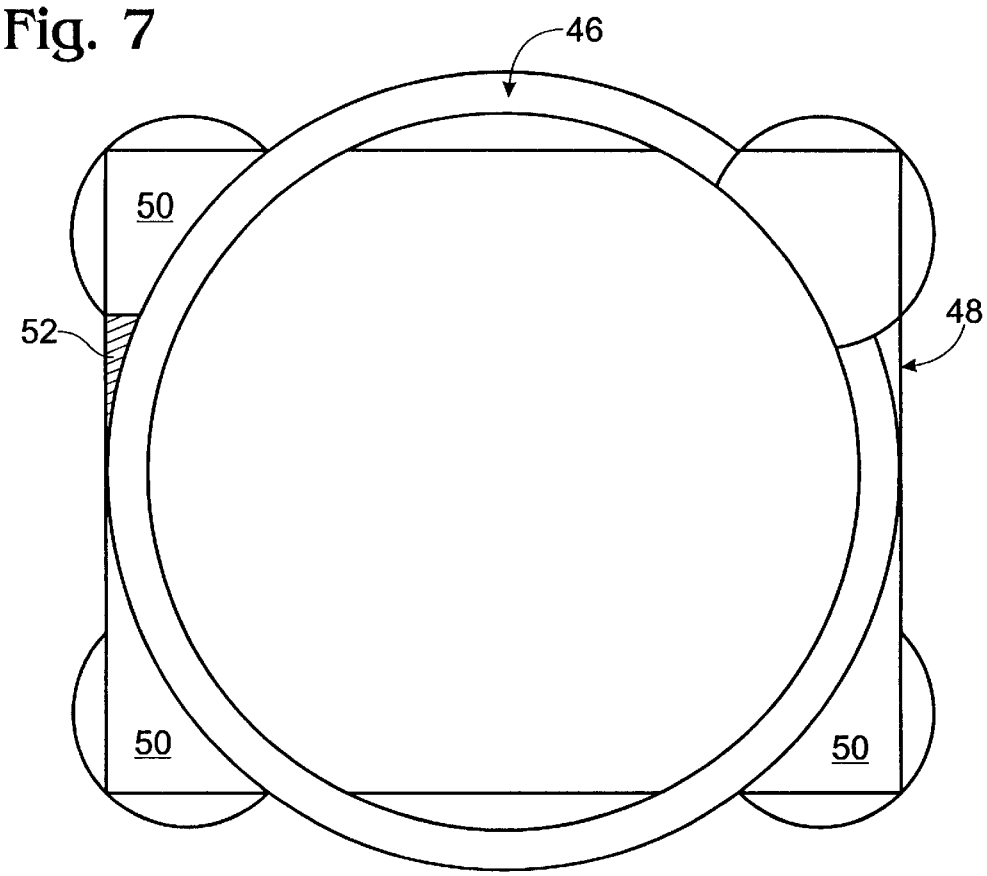

HIGH EFFICIENCY ILLUMINATION SYSTEM

FIELD OF THE INVENTION

The present invention relates to optimization of illumination systems so as to enhance their efficiency when used to illuminate non-circular objects (e.g. the rectangular image planes of film, slide, and LCD projectors).

BACKGROUND AND SUMMARY OF THE INVENTION

The need to illuminate non-circular (e.g. rectangular) objects dates back a century and more, and is presently exemplified by applications such as film and slide projectors, and LCD projection systems. These apertures have a variety of sizes with a range of aspect ratios, but typically fall into broad categories. Television pictures have ~4:3 aspect ratios and HDTV systems are proposed having 16:9 aspect ratios. Other computer graphics and motion picture formats use rectangular areas of similar aspects.

Light sources, in contrast, do not typically have a rectangular aspect. To the contrary; most emit light in nearly all directions (although they rarely have perfect 'isotropic' distribution characteristics due to shadowing caused by, e.g., the electrodes or filament mounting posts). Likewise, the optical elements used in association with imaging illumination systems are generally rotationally symmetric (e.g. circular), rather than of rectangular shape. Rotationally symmetric elements are easier to fabricate than others.

As a consequence of these practical considerations, the area illuminated by traditional illumination systems is circular. A designer of an imaging system is thus faced with a tradeoff in matching the projected illumination to the rectangular image shape. At one extreme, the illuminated area 10 can be made large enough to encompass the entire rectangular aspect 12, as shown in FIG. 1. However, this arrangement wastes light 14 outside the rectangular area, and is thus inefficient. The other extreme is to confine the circular illumination 16 entirely within the rectangular image frame 18, as shown in FIG. 2. This approach, however, leaves the corners 20 dim and thus suffers from poor illumination uniformity.

The problem, then, is to gather light emitted into a sphere and concentrate it onto a rectangle.

The preferred embodiment of the present invention builds on the "Kohler" illumination system. An exemplary Kohler system 22, shown in FIG. 3, includes a light source 24, a condenser lens 26, and a primary reflector 28. (The light source 24 is often offset about the center line so that the source does not shadow itself. This causes the apparent size of the source to double, but usually there is an increase in uniformity. This technique effectively doubles the efficiency of collection of light from sources that emit into a sphere.)

The Kohler illumination system 22 typically has poor efficiency of light collection, since the condenser lens 26 cannot be physically close enough to the light source 24 to intersect a sufficiently large portion of a hemisphere. The spherical mirror 28 used to reflect the light from the back hemisphere could intersect a larger angle, but need only have an angle as large as the condenser lens can address.

Despite this fundamental limitation, the Kohler system is often used because it provides predictably good divergence angle characteristics and can be readily fine-tuned, especially through the use of aspheric lens surfaces, to have outstanding uniformity of illumination across a circular object.

Divergence (or "angular extent") is the apparent angle β subtended by the area of the light source when viewed from the object to be illuminated. For most applications, it is desirable that the divergence be minimized, so the source more nearly approximates an ideal point source.

Instead of using Kohler systems, many modern film and LCD-based projection systems take advantage of the higher collection efficiencies provided by parabolic or elliptic reflectors. These systems are not as simple to design (and are still often built and tested iteratively, i.e. designed empirically) but often gather as much as 40% of the radiated light onto the rectangular object. (40% efficiency is not as poor as it may sound. Such systems may collect 70% of the light emitted by the source. Only 60% of the emitted light, however, is directed inside the rectangular image frame being illuminated (assuming a FIG. 1 illumination pattern); the balance is wasted outside the frame, resulting in the net 40% efficiency.)

The relatively high efficiencies of non-spherical reflectors comes at a cost: the extra light is generally of such a large angular extent that it cannot get through a reasonably-sized lens, and thus much of the increased efficiency is wasted by a mismatch between the numerical aperture (NA) (or F/#) of the imaging lens and the illuminator. Thus, such systems usually require that the lenses have an aperture twice as large as that for a Kohler system.

The uniformity of the reflector-based systems can be improved by fashioning the reflector facets to partially diffuse the source, but this tends to increase the apparent angular extent still more.

A further problem with parabolic and elliptical reflector-based systems is that they suffer from a 'hole in the middle' phenomenon because the lamp shadows the center of the reflected light. When viewing the illuminator from the object, one sees a bright 'donut' shaped distribution which leads to less than perfect imaging.

In accordance with one aspect of the present invention, light is gathered from a real source into a rectangular area (such as an LCD) with high efficiency of collection (>50% typically through the rectangular object aperture), while keeping a very small apparent angular extent and delivering excellent uniformity across the field. In one embodiment, this is achieved by use of 'auxiliary' reflectors to supplement the basic Kohler illumination system.

In the preferred embodiment, the central Kohler system is refined to have good uniformity and collection by itself; the auxiliary reflectors then supplement the illumination to the corners of the rectangular area to achieve illuminance levels comparable to the center without substantially changing the angle of illumination.

The foregoing and additional features and advantages of the present invention will be more readily apparent from the detailed description, which proceeds with reference to the accompanying drawings.

BRIEF DESCRIPTION OF THE FIGURES

FIG. 6 is a plan view of an illumination system according to one embodiment of the present invention.

FIG. 7 shows illumination of a rectangular image area by the embodiment of FIG. 6.

DETAILED DESCRIPTION

Figure 4:
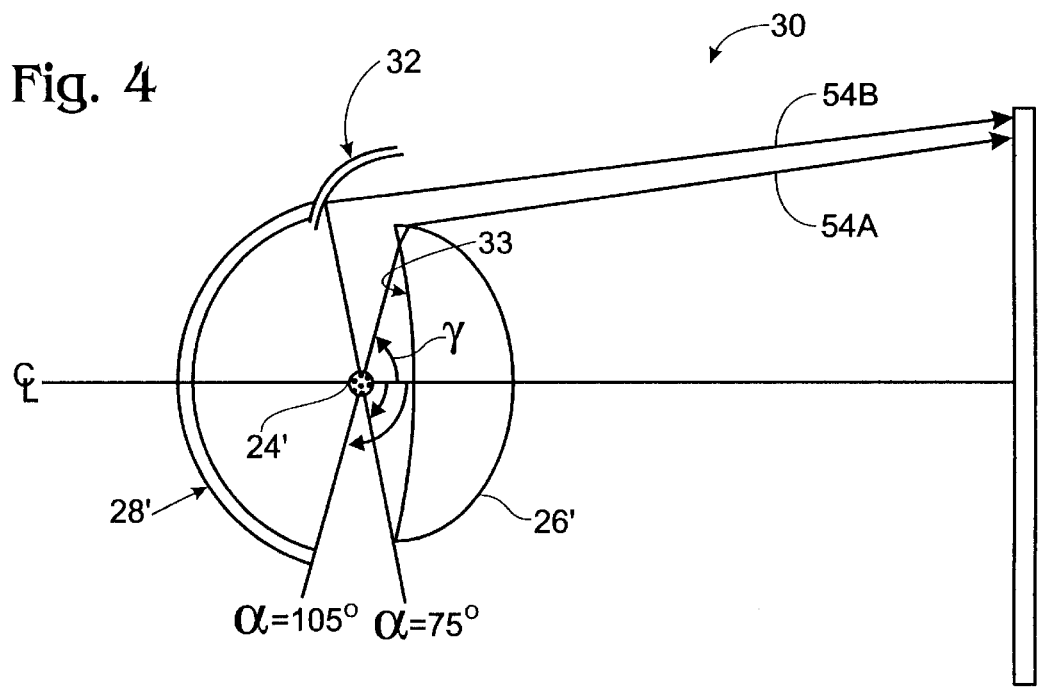
FIG. 4 is a side view of an illumination system according to one embodiment of the present invention.

FIG. 4 shows a side schematic view of an illumination system according to one embodiment 30 of the present invention. The illustrated embodiment includes the basic elements of a Kohler system (namely a light source 24', a condenser lens 26', and a primary reflector 28'), supplemented by one or more auxiliary reflectors 32. (The lower auxiliary reflector in FIG. 4 is omitted for clarity of illustration.) The elements of the Kohler system are reviewed first, followed by a discussion of the auxiliary reflectors 32.

The light source 24' is of conventional design and may comprise, for example, an arc lamp. The source in FIG. 4 is shown to be centered with respect to the condenser lens 26' and the primary reflector 28', but in other embodiments a more traditional offset position can be used.

The condenser lens 26' is preferably made in a fire-polished molding process, which is inexpensive and can yield adequate surface quality, especially for an aspheric surface. In this process one surface typically is confined to be spherical or plano, but one surface may be aspheric without incurring any extra machining operations.

In a particular embodiment, the condenser lens is of a meniscus configuration so that the angle of the light emitted by the source 24' and intercepted by this lens is increased. An intercepted angle γ of greater than 70° (e.g. 75°) is used in the preferred embodiment. The concave surface 33 of the aspheric lens is placed as close as possible to the source while still maintaining an adequate air gap for thermal considerations.

A suitable material for the condenser lens 26' is Schott F2, which has a relatively high index of refraction (i.e. 1.624). The lens should be highly tempered to allow it to withstand temperatures of 600° C. or more, as may be encountered next to a high wattage lamp.

In the illustrated embodiment, the primary reflector 28' is spherical in shape, but those skilled in the art will recognize that other shapes (e.g. parabolic or elliptical) can alternatively be used. The primary reflector is sized and positioned to subtend essentially the same angle of illumination γ from the source 24' as is subtended by the condenser lens 26'.

The traditional Kohler illumination wastes the light which misses the condenser lens 26' and does not reflect off the primary reflector 28'. This light can easily be a relatively large percentage of the total sphere of emittance. Considering just the lower hemisphere of light emitted from the source 24' in FIG. 4, the condenser lens 26' intercepts light directed at angles α extending from 0° to 75°. The primary reflector 28' intercepts light emitted in the range of 105° to 180°. The 30° of light between 75° and 105° (sometimes called the "waist" of the emitted light) is lost in the traditional Kohler system.

Figure 5:
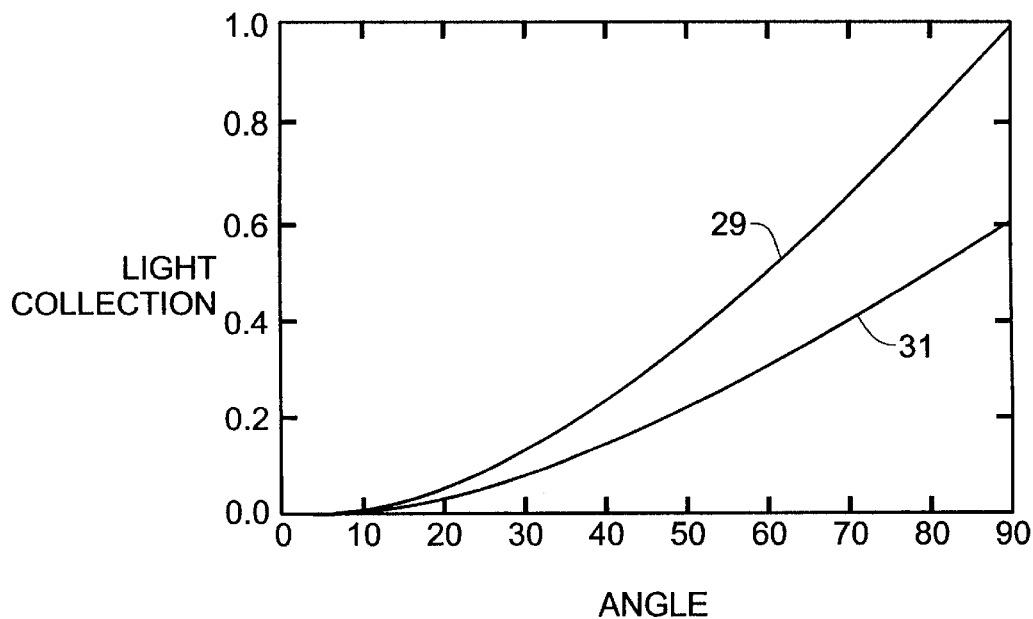
FIG. 5 is a graph showing collection efficiency of a Kohler illumination system onto both circular and rectangular areas as a function of the angle subtended by the condenser lens.

FIG. 5 details this wasted light by showing the light collection (percentage of a hemisphere) in a Kohler system as a function of the angle subtended by the condenser lens. (This plot assumes a source of infinitesimal extent, and that the primary reflector is spherical and subtends an angle equal to that subtended by the lens.) Curve 29 shows collection for a solid angle (i.e. illumination of a circular area), while curve 31 shows collection assuming a rectangular image frame with a 4:3 aspect ratio.

As can be seen from FIG. 5, relatively modest increases in the angle subtended by the collection lens can result in relatively significant increases in efficiency. For example, subtending a half-angle of 45° collects 29% of the hemispherical light, while subtending a half-angle of 70° more than doubles the collected light (i.e. to 66%).

The preferred embodiments of the present invention add additional reflective surfaces 32 to the Kohler system to intercept and utilize much (potentially all) of this wasted light. While this additional light can be used to further illuminate the circular image illuminated by the Kohler optics, the preferred embodiment directs this light to areas of the aperture that are typically poorly illuminated by Kohler systems, such as corners of a rectangular image area.

FIG. 6 is a plan view of an illumination system 34 according to one embodiment of the invention. Extending horizontally across the center of the figure is an arc lamp 36, which produces a bright illumination arc between its electrodes 38. Disposed over the lamp 36 is the condenser lens 40. Behind the lamp 36 is the spherical primary reflector 42.

The FIG. 6 embodiment includes four auxiliary reflectors 44. Each is of generally oval shape, although the ends nearest the arc lamp 36 have been cut to avoid possible flashovers from the high voltage lamp electrodes.

Each of the auxiliary reflectors 44 is shaped to direct light from the source's "waist" region into the corners of a rectangular image area. In the preferred embodiment, the reflectors are curved (i.e. have optical power) in two dimensions to effect this tailored illumination pattern. One dimension is that of radial extension from the source (i.e. tangential curvature), and the other is that of circumferential position about the source (i.e. sagittal curvature). (While the preferred embodiment is characterized by this rotational asymmetry, in other embodiments the reflector can be a surface of revolution.)

It will be noted that the auxiliary reflectors 44 in FIG. 6 are largely positioned within the circular aperture of the primary reflector 42, instead of outside this aperture (as was the case in FIG. 4). However, the auxiliary reflectors 44 are positioned far enough forward in the system (e.g. towards the condenser lens 40) that the primary reflector 42 is not thereby shadowed. Positioning of the auxiliary reflectors relative to the aperture of the primary reflector in this fashion is a consideration that can be driven as much by space and thermal constraints as by optical design requirements.

A number of different fabrication techniques can be used to implement the auxiliary reflectors 44, from stamped metal to faceted glass mirrors. A preferred embodiment uses cast zinc, which is specularly reflective. The zinc surface also has a small amount of diffusion or scatter to help improve the blending of the two distinct regions (i.e. illumination refracted by the condenser 40 and illumination reflected off the auxiliary mirrors 44).

The shaping of the reflectors necessary to effect the desired mapping of light from the source's waist region to the corners of the rectangular image area can be determined by use of a variety of widely available software tools. The present inventor utilizes an optical analysis program marketed under the trademark OPTICAD, made by the OPTICAD Corporation. Other candidate tools includes ASAP by Breault Research and LightTools by Optical Research Associates.

Referring to FIG. 7, the Kohler optics in the depicted embodiment are designed to produce a circular image 46 that illuminates the full width of the rectangular image area 48, and overfills in a vertical direction. The auxiliary reflectors 44 (FIG. 6) then illuminate the corners 50. (The circular image 46 has double lines indicating its extent. This is because the edge of this area is not sharply defined, due to the non-infinitesimal source size.)

In the illustrated embodiment, the auxiliary reflectors 44 deliberately do not illuminate four small wedge areas 52. This is a consequence of the particular shape and curvature of the reflectors 44. In other embodiments, a nearly arbitrary illumination pattern can be fashioned by appropriate shaping of the reflectors. (As a practical matter, the illumination pattern in FIG. 7 actually provides illumination to the wedge areas 52 by virtue of the source's finite size.)

The preferred embodiment has a number of interesting properties. One is that light reflected from the auxiliary reflectors "blends" with that refracted from the condenser lens. Referring back to FIG. 4, the direction of a light ray 54A refracted at a peripheral region of the condenser lens 26' (a "rim ray") is the same as the direction of an adjoining light ray 54B reflected by a peripheral region of the auxiliary reflector 32.

Figure 8:
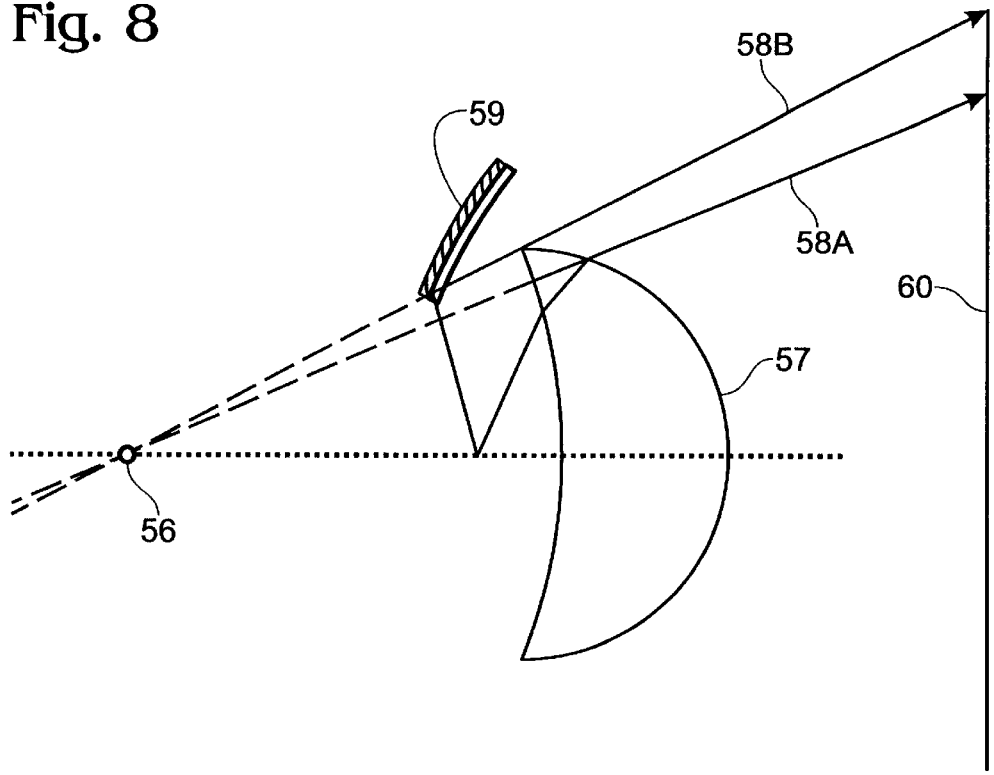
FIG. 8 illustrates that illumination from an illustrative embodiment of the invention all appears to emanate from the same point.

A consequence of this "blending" characteristic—particularly important in imaging applications—is that all light rays appear to originate from the same point 56, as shown in FIG. 8. That is, light rays 58 traced backwards from the object 60 being illuminated all converge on the same imaginary point 56, regardless of whether the light ray came via the condenser lens 57 (ray 58A), or via the auxiliary reflectors 59 (ray 58B).

A related characteristic is that light illuminating the object in the preferred embodiment takes two distinct paths. Light emitted by the source in certain directions (e.g. α in the range 0° to 75°, as shown in FIG. 4) is refracted by the condenser lens, but is not reflected off the auxiliary reflector. Light emitted by the source in certain other directions (e.g. α in the range of 75° to 105°) is reflected off the auxiliary reflector but is not refracted by the condenser lens. In embodiments using a primary reflector, light emitted by the source in third directions (e.g. α in the range of 105° to 180°) is first reflected (off the primary reflector) and then refracted.

Another attribute of the preferred embodiment is "inversion" of the light emitted in the source's waist region. Consider regions of the illuminated object successively displaced in a radial direction from the center. Light illuminating the center of the object is emitted from the source at an angle α of 0°. Light illuminating a first range of these successively displaced regions is emitted from the source at a range of successive angles between 0° and 75°. Light illuminating an adjoining, further range of successively displaced regions is emitted from the source at a range of successive angles between 105° and 75°. Thus, an inversion occurs in the region of 105° to 75°.

Figure 1:
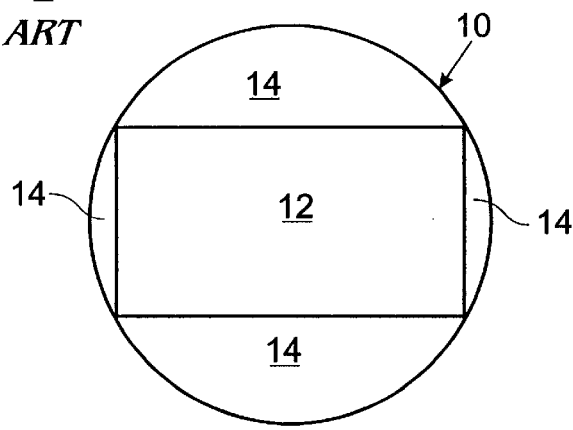
FIG. 1 is an illustration showing uniform illumination of a rectangular area with a circular image.
Figure 2:
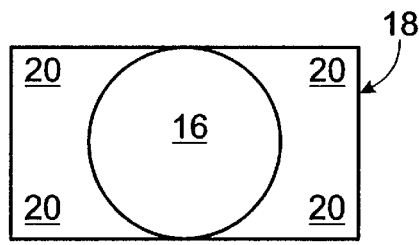
FIG. 2 shows high efficiency illumination of a portion of a rectangular area with a circular image.
Figure 3:
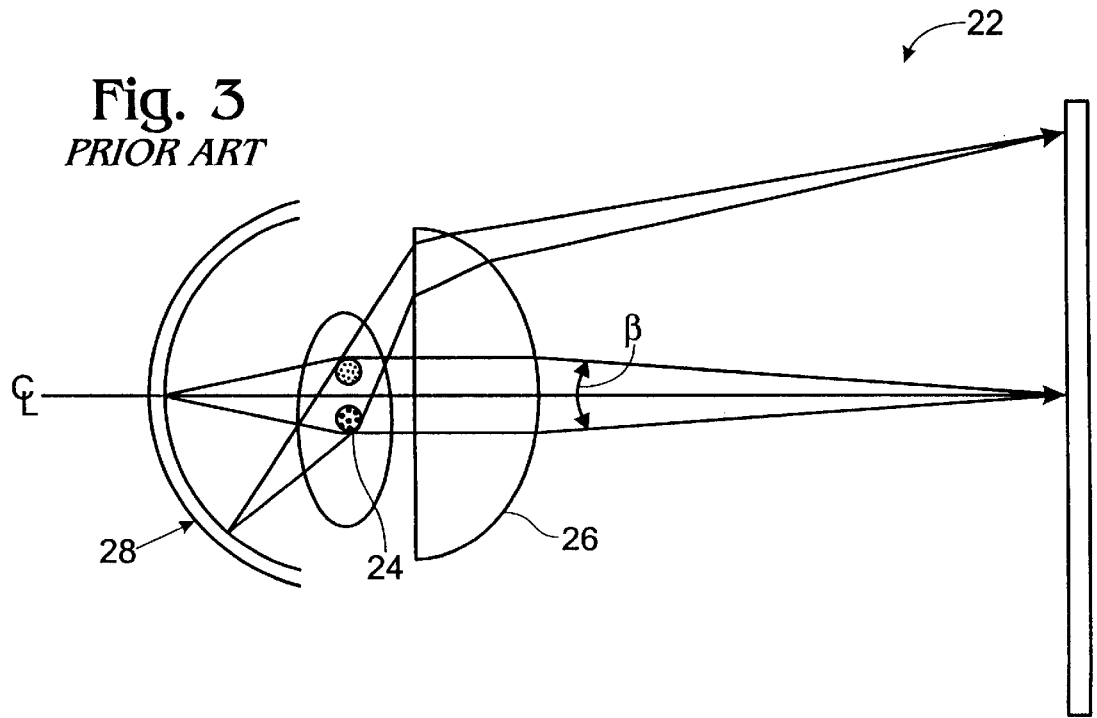
FIG. 3 is an illustration of a prior art Kohler illumination system, showing the limited angle subtended by the condenser lens.

As was explained earlier in connection with FIGS. 1 and 2, many prior art systems traded off efficiency for illumination uniformity, or vice versa. There is a further factor that is also involved in these tradeoffs: apparent source magnification. For optimum results in an imaging system, the apparent source magnification should be minimized (i.e. equal to 1.0). This produces imaging results most nearly in accord with the theoretical model of a point source. If this factor is optimized, however, then either (or both) efficiency and illumination uniformity suffers. Conversely, if substantial magnification of the source can be tolerated, then a corresponding improvement in efficiency and illumination uniformity can be achieved (as is the case with homogenizers).

Taking all three criteria into account, a figure of merit $\zeta$ of an imaging illumination system can be defined as:

$$\zeta = \mu \eta \acute{e} \qquad (1)$$

in which:

$\mu$ is uniformity of illumination, $\eta$ is efficiency, and $\acute{e}$ is 1/(apparent magnification of source extent).

Uniformity of illumination $\mu$ can be measured in various ways, such as the standard ANSI 9 point measurement. The present inventor prefers a more rigorous measurement, known as a 25 point corner-to-center measurement. The rectangular image frame is partitioned into five equal-width vertical columns and five equal-width horizontal rows, thereby defining 25 areas. Illumination intensity is measured at the center of the frame, and in the centers of the four extreme corner areas. The corner-to-center ratio defines the illumination uniformity $\mu$. (An alternative measurement technique, termed the 25 point minimum-to-maximum measurement, is the ratio of the minimum illumination intensity to the maximum illumination intensity among the 25 areas.)

A well designed classical Kohler illumination system has a figure of merit $\zeta$ of less than 0.05. In contrast, systems according to the preferred embodiments of the present invention have values of $\zeta$ greater than 0.05—often 0.07, 0.1, 0.2, or more. This holds both for the 25 point corner-to-center measurement, and the 25 point minimum-to-maximum measurement.

Efficiency, $\eta$, is determined as the percentage of light illuminating the object, as compared with the total light emitted by the source. While this parameter is highly implementation dependent, efficiencies in excess of 60% are not uncommon in systems according to the present invention.

Those skilled in the art will recognize that the illumination provided by a condenser lens is not necessarily uniform, even within the circular area illuminated. This can be mitigated, e.g. by use of aspherics. If desired, the auxiliary reflectors of the present invention can be shaped to cast additional light within the circular area, supplementing its illumination by the condenser lens.

In some applications, e.g. flashlights or spot illuminators, there is no need to create a rectangular object illumination. In such cases the auxiliary reflector can be continuous and circularly symmetric, preferably of a toric shape (or defined as a polynomial section that is swept through a circle to create an arbitrary reflection tailored to increase the flux at the edge of the illuminated spot, or else taper off gradually, whichever is desired).

In the case of a rectangular object, the auxiliary reflectors can be divided into four pieces, each piece concentrating light into one corner of the object. In this case the reflectors can be designed to 'push' the flux into the corner regions, avoiding wasting light in illuminating regions outside of the aperture of the object and increasing the flux density slightly at the edges and corners (where light directed from the condenser lens does not reach).

The auxiliary reflectors may be similar to each other by virtue of bilateral symmetry, so that opposite corners are identical to each other and adjacent corners are similar but opposite.

(In the case of a square aperture, these auxiliary reflectors would be exactly identical and no rectangular shaping would be required, but they might still have some biaxial or spherical curvature to pull in the light from top and sides, that would otherwise fall outside the object, into the corners of the object aperture.)

If the light source is an arc lamp, the electrodes usually produce a shadowing effect off the ends of the bulb. In the preferred embodiment, the bulb is oriented so that this shadowing is directed where illumination is not required, such as at the top and bottom centers of a rectangular image frame.

To provide a comprehensive disclosure without unduly lengthening this specification, applicant incorporates by reference the disclosures of the following U.S. Patents, which provide additional details on the design of high efficiency illumination systems: U.S. Pat. Nos. 4,913,529, 5,046,837, 5,092,672, 5,098,184, 4,516,832, 4,619,508, and 4,918,583. Applicant also makes reference to the following publications, which are known to those skilled in the art, and which provide useful background information: Nicholas, C. et al, "Analysis of the Optical Components in Liquid Crystal Projectors by Their Geometrical Extend," (sic) Proceedings of EuroDisplay, Strasbourg, France, September, 1993, pp. 537–539; and Koch, D., "Simplified Irradiance/Illuminance Calculations in Optical Systems," presented at the International Symposium on Optical Systems Design, Berlin, Germany, Sep. 14, 1992.

Having described and illustrated the principles of my invention with reference to various illustrative embodiments, it will be apparent that the detailed embodiments can be modified in arrangement and detail without departing from such principles. For example, while the invention has been illustrated with reference to embodiments in which light reflected off the auxiliary mirror does not pass through the condenser lens, in other embodiments, some passage of such light may be desirable. Similarly, while the preferred embodiment has been illustrated with reference to a circular condenser lens, it will be recognized that other lens shapes can alternatively be used. For example, it may sometimes be desirable to 'cut back' sides or edges of the condenser lens and use the auxiliary mirrors to shape the resulting illumination more than is possible with a circular condenser lens. Still further, while the invention has been particularly illustrated with reference to illumination of a rectangular object, it will be recognized that the principles thereof are applicable to illumination of objects of any shape.

While the foregoing discussion has focused on systems employing substantially isotropic light sources, it will be recognized that the invention can likewise utilize light sources with shaped illumination patterns (e.g. the quasi-hemispherical pattern produced by LEDs).

Figure 9:
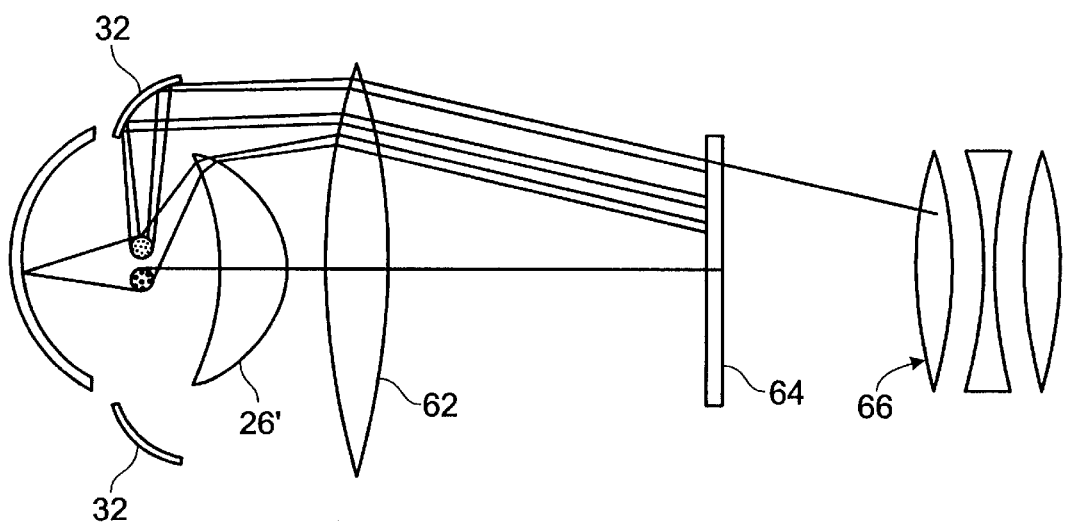
FIG. 9 shows a further embodiment of the present invention.

It will be apparent to those skilled in the art that the principles of the present invention can be utilized in a variety of more complex systems. FIG. 9 shows one such system, wherein a secondary condenser lens 62 (which may be Fresnel, biconvex glass etc.) is used between the primary condenser 26' and an object 64—such as an LCD—to be illuminated. The resulting image is projected by a subsequent projection lens 66. It will be noted that the secondary condenser lens 62 receives incident illumination both from the primary condenser lens 26' and the auxiliary reflectors 32.

Those skilled in the art will recognize that a number of further modifications can be made to the depicted systems, e.g. in the form of variations in the primary reflector, condenser lens, and auxiliary reflector, and by the addition of further optical elements thereto. One such modification addresses the difference in illumination intensity provided axially through the condenser lens, versus the illumination intensity provided via the auxiliary reflectors. The former generally is twice as intense as the latter by reason of reimaging of the source by the primary reflector. The auxiliary reflector has no counterpart augmenting its reflected illumination. Artisans will recognize, however, that this is a design issue that can be addressed readily if desired, e.g. by placement of the primary (spherical) reflector so that the plane defined by its aperture includes the source. The spherical reflector will thereby provide reflection into auxiliary reflectors positioned between the source's plane and the condenser lens (e.g. reflectors positioned to subtend the angles $\alpha$ 75°–90° in FIG. 4).

The above-mentioned variation prompts the further observation that the auxiliary reflectors can subtend any range of angles $\alpha$ between the condenser lens and the primary reflector. In some embodiments, it may be advantageous to have the auxiliary reflectors extend solely in front of the source (e.g. subtend angles $\alpha$ less than 90°), while in others it may be advantageous to have the auxiliary reflectors extend solely behind the source (e.g. subtend angles $\alpha$ greater than 90°). In yet other embodiments, the auxiliary reflectors can span both sides of the 90° angle or, in special circumstances, can even extend beyond the illustrated 75° and 105° positions and shadow the primary reflector or condenser lens.

In view of the wide variety of embodiments to which the principles of my invention can be applied, it should be apparent that the detailed embodiments are illustrative only and should not be taken as limiting the scope of my invention. Rather, I claim as my invention all such modifications as may come within the scope and spirit of the following claims and equivalents thereto.

I claim:

1. A method of collecting light from a source to illuminate a rectangular object in an imaging system, the source emitting light in first and second directions, the method including:

collecting and refracting onto the object with a lens light emitted in the first direction; and collecting and reflecting onto the object with a mirror light emitted in the second direction, the light being reflected into corners of the rectangular object;

wherein the object is illuminated with (a) light refracted from the first direction but not reflected by the mirror, and (b) light reflected from the second direction but not refracted by the lens.

2. The method of claim 1 in which the light illuminating the object propagates thereto as if from a common origin.

3. The method of claim 1 in which the source emits light in first, second, and third directions, and in which the method further includes:

collecting and reflecting through the lens and onto the object light emitted in the third direction.

4. A method of directing light from a source to an object with a lens and a mirror, the method comprising:

refracting light with the lens; and reflecting light with the mirror;

wherein rim rays from the lens are adjacent and substantially parallel to those from the mirror.

5. The method of claim 4 which includes directing substantially none of the light reflected from the mirror through the lens.

6. An illumination system for collecting light from a source, the system including a lens for gathering light in a central region and a reflector for gathering light in a peripheral region, characterized in that a light ray at an edge of the central region is refracted in a first direction, and a light ray at an adjoining edge of the peripheral region is reflected in the same first direction, wherein blending of the refracted and reflected light occurs.

7. The illumination system of claim 6 in which the reflector is characterized by rotational asymmetry.

8. The illumination system of claim 6 in which the reflector is characterized by a curvature that is not a surface of revolution.

9. The system of claim 6 in which the reflector includes curvature in tangential and sagittal directions.

10. An illumination system for an imaging apparatus, characterized by a value of $\zeta$ greater than 0.05, where:

$$\zeta = \mu \eta \acute{e}$$

in which:

$\mu$ is corner-to-center uniformity of illumination in a 25 point measurement, $\eta$ is efficiency, and $\acute{e}$ is 1/(magnification of source extent).

11. The illumination system of claim 10 in which $\zeta$ is greater than 0.07.

12. The illumination system of claim 10 in which $\zeta$ is greater than 0.1.

13. The illumination system of claim 10 in which $\zeta$ is greater than 0.2.

14. In an illumination system for an imaging apparatus, the illumination system including a condenser lens for collecting light from a source, an improvement comprising a mirror for collecting light and diverting said light to corner regions of a rectangular object to be illuminated, said diverted light not passing through the condenser lens.

15. The system of claim 14 in which the reflected and refracted light all diverges, as if from a common origin, as it illuminates an object in the imaging apparatus.

16. The system of claim 14 in which the mirror includes curvature in tangential and sagittal directions.

17. An imaging apparatus including a light source and a collection system for illuminating an object, the collection system characterized in that:

light illuminating a center of the object is emitted from the source at an angle of J°;

light illuminating a first range of successively radially displaced regions of the object is emitted from the source at a range of successive angles between J° and N°; and light illuminating a second, further range of successively radially displaced regions of the object is emitted from the source at a range of successive angles between M° and N°;

wherein a mapping of light from the source to the object is inverted in the range N°–M°.

\* \* \* \* \*